United States Patent
Har-Tal et al.

(10) Patent No.: US 11,170,164 B2
(45) Date of Patent: Nov. 9, 2021

(54) SYSTEM AND METHOD FOR CELL COMPARISON BETWEEN SPREADSHEETS

(71) Applicant: DataRails LTD., Rishon LeZion (IL)

(72) Inventors: Oded Har-Tal, Beit Hashmonai (IL); Adam Spiro, Tel Aviv (IL)

(73) Assignee: Datarails Ltd., Rishon Lezion (IL)

( * ) Notice: Subject to any disclaimer, the term of this patent is extended or adjusted under 35 U.S.C. 154(b) by 125 days.

(21) Appl. No.: 15/837,727

(22) Filed: Dec. 11, 2017

(65) Prior Publication Data

US 2018/0165267 A1 Jun. 14, 2018

Related U.S. Application Data

(60) Provisional application No. 62/432,587, filed on Dec. 11, 2016.

(51) Int. Cl.
| | |
|---|---|
| *G06F 21/00* | (2013.01) |
| *G06F 40/18* | (2020.01) |
| *G06F 40/194* | (2020.01) |
| *G06F 40/258* | (2020.01) |
| *G06F 40/279* | (2020.01) |

(52) U.S. Cl.
CPC ............ *G06F 40/18* (2020.01); *G06F 40/194* (2020.01); *G06F 40/258* (2020.01); *G06F 40/279* (2020.01)

(58) Field of Classification Search
CPC .......... G06F 17/24; G06F 17/25; G06F 40/18; G06F 40/194; G06F 40/258; G06F 40/279; G06T 11/60; A63F 2300/5553; A63F 2300/6623

USPC .......... 715/201, 202, 230, 255, 219
See application file for complete search history.

(56) References Cited

U.S. PATENT DOCUMENTS

| | | |
|---|---|---|
| 8,601,383 B2 | 12/2013 | Folting et al. |
| 9,170,990 B2 | 10/2015 | Weihe |
| 9,275,031 B2 | 3/2016 | Dickerman et al. |
| 9,305,176 B2 | 4/2016 | Gloski et al. |
| 9,460,073 B2 | 10/2016 | Danziger et al. |
| 2007/0011211 A1* | 1/2007 | Reeves .................. G06F 40/18 |
| 2009/0158251 A1* | 6/2009 | Angrish ............... G06F 16/258 717/115 |
| 2009/0182763 A1* | 7/2009 | Hawking .............. G06F 16/176 |
| 2009/0327851 A1 | 12/2009 | Raposo |

(Continued)

*Primary Examiner* — Kavita Stanley
*Assistant Examiner* — Jenq-Kang Chu
(74) *Attorney, Agent, or Firm* — M&B IP Analysts, LLC

(57) ABSTRACT

A method and system for cell tracking between spreadsheets. The method includes: assigning a unique first identifier to each cell containing data within a first spreadsheet; identifying characteristics of each cell containing data within the first spreadsheet and each cell containing data within at least one second spreadsheet, wherein the characteristics include data and metadata associated with each of the cells and wherein the first spreadsheet and the at least one second spreadsheet comprise at least a two-dimensional array of cells; analyzing the cells of the at least one second spreadsheet to compare each cell therein to the cells of the first spreadsheet, wherein the comparison is based on the identified characteristics of each cell, and wherein a comparison above a predetermined threshold is identified as a match; and assigning the unique first identifier of a cell of the first spreadsheet to a matching cell of the at least one second spreadsheet.

15 Claims, 3 Drawing Sheets

(56) References Cited

U.S. PATENT DOCUMENTS

| | | | |
|---|---|---|---|
| 2010/0174678 A1* | 7/2010 | Massand | G06F 40/18 707/610 |
| 2013/0145244 A1 | 6/2013 | Rothschiller et al. | |
| 2014/0082470 A1 | 3/2014 | Trebas et al. | |
| 2014/0372855 A1 | 12/2014 | Myerscough et al. | |
| 2015/0309967 A1 | 10/2015 | Presler-Marshall et al. | |
| 2015/0309979 A1 | 10/2015 | Presler-Marshall et al. | |

* cited by examiner

First Spreadsheet

310

315

|  | January id: 1 | Feb id: 2 | Mar id: 3 |
|---|---|---|---|
| Apples id: 4 | 18 id: 5 | 25 id: 6 | 37 id: 7 |
| Bananas id: 8 | 19 id: 9 | 12 id: 10 | 6 id: 11 |
|  |  |  |  |

Second Spreadsheet

320

|  | January id: 1 | Feb id: 2 |
|---|---|---|
| Apples id: 4 | 9 id: 5 | 56 id: 6 |
| Bananas id: 8 | 3 id: 9 | 23 id: 10 |
| Grapes id: 12 | 19 id: 13 | 12 id: 14 |

FIG. 3

SYSTEM AND METHOD FOR CELL COMPARISON BETWEEN SPREADSHEETS

CROSS-REFERENCE TO RELATED APPLICATIONS

This application claims the benefit of U.S. Provisional Application No. 62/432,587 filed on Dec. 11, 2016, the contents of which are hereby incorporated by reference.

TECHNICAL FIELD

The present disclosure relates generally to spreadsheet analysis, and more particularly to identifying and comparing cells of two or more spreadsheets and determining the differences between matching cells.

BACKGROUND

Spreadsheets are interactive computer application programs for organization, analysis, and storage of data in tabular form. Spreadsheets are developed as computerized simulations of paper accounting worksheets. The program operates on data represented as cells of an array, organized in horizontal rows and vertical columns. Each cell of the array is a model-view-controller element that may contain either numeric or text data, or the results of formulas that automatically calculate and display a value based on the contents of other cells. Each cell may further include associated metadata, such as formatting and relationships to other cells.

Spreadsheets are designed to be easy to modify. Changes can be made in a spreadsheet by changing its structure, changing data without modifying the structure, or changing the structure and the data. For example, changing the structure may include adding or removing rows or columns, and/or changing cells' locations. The data changes may include changing values in particular cells. Currently, changes are tracked by saving a copy of a spreadsheet as a different file version.

As such, tracking the changes and identifying the differences among different files (of different spreadsheet versions) is a more complicated task. As an example, a user manually comparing spreadsheets having thousands of cells is a practically impossible task. The time that would be required for such a comparison could be days, and still fail to provide an assurance that all differences between the versions has been accurately tracked.

Currently available computer application programs are very limited in their comparison functions and do not provide for an accurate representation of such changes. For example, the compare tool offered in Microsoft® Excel® is limited to comparing tables having the same structure. Thus, if a cell (e.g., carrying a value calculated by a certain formula) is moved to a different location, such change would not be identified. The cells' values would be marked as deleted even when cells' values have been moved, for example, one column right. Further, the compare tool by Excel® is limited to compare only between two files.

In addition, utilization of computing resources, such as CPU time, storage, and memory required for comparing the spreadsheets is very high. As such, in many cases, the comparison of spreadsheets run, for example, on a personal computer (PC) may not be a feasible task or would take a long time to complete. For example, to open a large Excel® file (e.g., 1 GB) could take a few hours on a standard PC. Further, comparing Excel® files (or even just changing such files) could significantly increase the memory and CPU utilization of a PC. In addition, current tools allow comparisons between two versions of files. As such, each file version must be stored, which requires storage devices with high capacity.

It would be therefore advantageous to provide a solution that overcomes the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The embodiments disclosed herein include cell tracking between spreadsheets. The method includes: assigning a unique first identifier to each cell containing data within a first spreadsheet; identifying characteristics of each cell containing data within the first spreadsheet and each cell containing data within at least one second spreadsheet, wherein the characteristics include data and metadata associated with each of the cells and wherein the first spreadsheet and the at least one second spreadsheet comprise at least a two-dimensional array of cells; analyzing the cells of the at least one second spreadsheet to compare each cell therein to the cells of the first spreadsheet, wherein the comparison is based on the identified characteristics of each cell, and wherein a comparison above a predetermined threshold is identified as a match; and assigning the unique first identifier of a cell of the first spreadsheet to a matching cell of the at least one second spreadsheet.

The embodiments disclosed herein also include a non-transitory computer readable medium having stored thereon instructions for causing a processing circuitry to execute a process, the process including: assigning a unique first identifier to each cell containing data within a first spreadsheet; identifying characteristics of each cell containing data within the first spreadsheet and each cell containing data within at least one second spreadsheet, wherein the characteristics include data and metadata associated with each of the cells and wherein the first spreadsheet and the at least one second spreadsheet comprise at least a two-dimensional array of cells; analyzing the cells of the at least one second spreadsheet to compare each cell therein to the cells of the first spreadsheet, wherein the comparison is based on the identified characteristics of each cell, and wherein a comparison above a predetermined threshold is identified as a match; and assigning the unique first identifier of a cell of the first spreadsheet to a matching cell of the at least one second spreadsheet.

The embodiments disclosed herein also include a system for cell tracking between spreadsheets, including: a processing circuitry; and a memory, the memory containing instructions that, when executed by the processing circuitry, configure the system to: assign a unique first identifier to each cell containing data within a first spreadsheet identify characteristics of each cell containing data within the first spreadsheet and each cell containing data within at least one second spreadsheet, wherein the characteristics include data and metadata associated with each of the cells and wherein the first spreadsheet and the at least one second spreadsheet comprise at least a two-dimensional array of cells; analyze the cells of the at least one second spreadsheet to compare each cell therein to the cells of the first spreadsheet, wherein the comparison is based on the identified characteristics of each cell, and wherein a comparison above a predetermined threshold is identified as a match; and assign the unique first identifier of a cell of the first spreadsheet to a matching cell of the at least one second spreadsheet.

BRIEF DESCRIPTION OF THE DRAWINGS

The subject matter particularly pointed out and distinctly claimed in the claims at the conclusion of the specification is part of the disclosure. The foregoing and other objects, features, and advantages of the disclosure will be apparent from the following detailed description taken in conjunction with the accompanying drawings.

FIG. 3 is a diagram showing a first spreadsheet and a second spreadsheet with cell identifiers showed therein.

DETAILED DESCRIPTION

Figure 1:
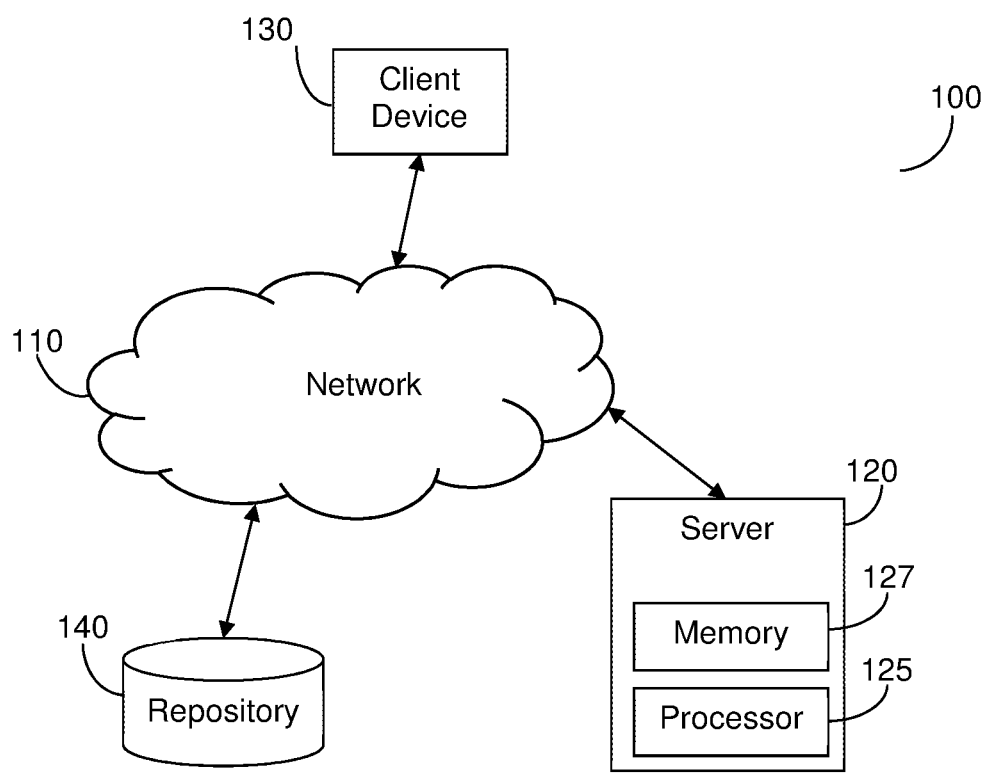
FIG. 1 is a network diagram of a system for cell comparison between spreadsheets according to an embodiment.

It is important to note that the embodiments disclosed herein are only examples of the many advantageous uses of the teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

According to some example embodiments, a method and system for cell comparison between spreadsheets is provided. The system is configured to compare between at least two spreadsheets (e.g., a first and a second version of a spreadsheet), by tracking changes within cells of the spreadsheets.

In an embodiment, each cell containing data in a first spreadsheet is assigned an identifier based on certain characteristics associated with that cell. For example, a first cell in the first spreadsheet is assigned a first identifier. The identifier may include an alphanumeric string that is unique for each cell. For example, cell B1 may be assigned an identifier of 'ID: 1', cell C1 may be assigned an identifier of 'ID: 2', and so on. A second spreadsheet is searched for cells containing similar characteristics to the first cell. A second cell in the second spreadsheet that contains similar characteristics to the first cell, above a predetermined threshold, is determined to be a matching cell and is assigned the same first identifier. The data of the second cell is compared to the data of the first cell, where the comparison may include calculating a difference in the value of the data between the first cell and matching second cell. Further differences may be indicated, such as if a cell or an entire table has been moved, been modified, contain different formulas (e.g., even if they produce the same resulting value), and so on. Formatting changes, such as font, text, color, of a cell or table, may be identified as well.

The disclosed techniques may provide technical improvements such as, but not limited to, lower memory and CPU utilization (since only cells determined to be sufficiently matching are compared), than other methods. For the same reasons, the time required to identify differences between different versions of spreadsheets is also reduced as compared to current methods.

A spreadsheet, as discussed in the context of the disclosed embodiments, may be an interactive computer application program for organization, analysis and storage of data in tabular form. The program operates on data represented as cells of an array, organized in rows and columns. Each cell of the array is a model-view-controller element that may contain either numeric or text data, or the results of formulas that automatically calculate and display a value based on the contents of other cells. A spreadsheet typically includes headers including data and metadata, and content values related to the headers. Metadata may include the formatting associated with each cell.

FIG. 1 is an example network diagram 100 utilized to describe the various embodiments for cell comparison between spreadsheets and identifying differences respective thereof.

The various embodiments may be performed by a server 120 connected to a network 110. The server 120 may include a processing circuitry 125 and a memory 127. The processing circuitry 125 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In an embodiment, the memory 127 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, cause the processing circuitry to perform the various processes described herein. Specifically, the instructions, when executed, configure the processing circuitry 125 to identify matching cells within spreadsheets and compare their values, as discussed further herein.

In an embodiment, the system further includes a data repository 140 utilized to store (temporary or permanently) spreadsheet files uploaded by users, e.g., using a client device 130. The data repository 140 may be, for example, a database, a cloud database, a data warehouse, and the like.

The client device 130 communicates with the data repository 140 and the server 120 over the network 110. The network 110 may be the Internet, the world-wide-web (WWW), a local area network (LAN), a wide area network (WAN), a metro area network (MAN), and other networks capable of enabling communication between the elements of the system 100. The client device 130 may be for example, a smart phone, a mobile phone, a laptop, a tablet computer, a wearable computing device, a personal computer (PC), and the like.

According to certain embodiments disclosed, the server 120 may be configured to receive a first spreadsheet and a second spreadsheet uploaded from the client device 130. Further, the spreadsheets may be received or may be collected from another source such as the data repository 140, e.g., a database, a cloud database, a website, and the like.

In an embodiment, the first spreadsheet is generated (or modified) before the second spreadsheet. Each of the first and second spreadsheets includes multiple cells organized in at least a two-dimensional array. The cells may include header cells and value cells, where header cells are descriptive of the value cells, and wherein each of the header cells and value cells contain data and metadata. For example, a header cell may include a month label, e.g., 'January', and a value cell may include a number of sales, e.g., '38', for that month.

The data within the cells may include a letter, a word, a number, a character, a formula, a combination thereof, and so on. The metadata may include a text font, a text size, a number formatting, a border, header's cell's location, text color, cells' structure, cells' reference, a combination thereof and so on. The metadata associated with the cells' structure may indicate, for example, a group of six cells bounded by a thick border, divided to two rows and three columns, and so on.

The metadata associated with the cells' structure may be, for example, a cell including a certain formula that refers to 27 other cells. The metadata of the cells may be recursive. That is, in case a first group of cells is identified, a second group of cells related to the first group of cells may be identified, thus, other cells related to the second group of cells can be identified, and so on and so forth.

Each of the plurality of cells may include therein one or more characteristics, where the characteristics are associated with the data and metadata of the cells, as well at the context of the cell, e.g., how the cell relates to other cells. The characteristics can be used to identify the cells. For example, the characteristics associated with the cells' structure may indicate a group of six cells bounded by a thick border, divided to two rows and three columns, etc. The characteristics associated with the cells may further indicate that the cell comprises a certain formula that refers to 20 other cells.

For example, the word "month" in a cell number (A1) may represent the data of the header located above 12 cells, having metadata that may be indicative of the text size, font's type, text color, cell's location, and so on. According to the same example, the content values may be represented by the information located within the 12 cells located beneath the header represented by the word "month." For example, the content value of cell number (A2) may be "January," the content value of cell number (A3) may be "February," the content value of cell number (A13) may be "December." It should be noted that the letters represent columns in the spreadsheet and the digits represent the row number.

In an embodiment, the server 120 is configured to analyze the first and second spreadsheets to identify the data and metadata associated with the cells within each spreadsheet. The analysis may include generating a first identifier associated with each cell within the first spreadsheet. A second spreadsheet is analyzed to determine if it contains cells having similar characteristics to at least one of the cells within the first spreadsheet. If a second cell in the second spreadsheet is determined to be similar to the first cell in the first spreadsheet, e.g., certain characteristics match above a predetermined threshold, the second cell is assigned the same first identifier as the first cell. In an embodiment, the content of the second cell is compared to the content of the first cell, where the comparison may include calculating a difference in the value of the first cell and the matching second cell. The server 120 is configured to compare the data, the metadata, or both, associated with the cells of the first spreadsheet and the cells of the second spreadsheet which share a common identifier.

For example, if the word "employees" appears within a header cell located in a first spreadsheet, it may be compared to a cell having the same word "employees" within a second spreadsheet. Further, metadata associated with the header cell represented by the word "employees" located within the first spreadsheet may be compared to metadata associated with the header represented by the word "employees" located within the second spreadsheet. The metadata may indicate, for example, location within the spreadsheet, such as that the header "employees" of the first spreadsheet is located within cell number (D1) and that the header "employees" of the second spreadsheet located within cell number (D4).

As a further non-limiting example, the server 120 may identify, in two spreadsheets, two header cells that include the word "January," the header cell of the first spreadsheet having metadata that indicates that the cell number is (B1), the font type is "Arial" and that the text color is green. According to the same example, the second header cell, which also include the word "January," includes metadata that indicates that the cell number at which the header cell is located is (H1), that the font type is "Arial" and that the text color is green as well. According to this example, the header cells will be classified as similar header cells.

In an embodiment, the server 120 may identify data and metadata that indicates that some headers are dissimilar. For example, one header associated with a first spreadsheet includes the word "expenses" while a header located within a second spreadsheet at the same location may include the word "incomes."

Cells determined to have sufficiently similar characteristics are deemed to be a match. Sufficiently similar characteristics may include sharing enough data or metadata above a predetermined threshold. For example, if a first cell contains the same text and location as a second cell, a match may be determined, even if the formatting of the cells do not align.

Based on the match, the server 120 may be configured to determine the differences between the data and the metadata associated with the content values of the first spreadsheet and the data and the metadata associated with the content values of the second spreadsheet. That is, the server 120 may determine if more content values were added, removed, or moved to different locations within the spreadsheet.

In an embodiment, the server 120 may display the differences between the data and the metadata of the content values of the first spreadsheet and the data and the metadata of the content values of the second spreadsheet on a user interface (not shown) of the client device 130. According to another embodiment, the server 120 may send a notification to the client device 130 with respect to identification of changes made in a the first spreadsheet and the at least one second spreadsheet.

It should be noted that a single client device 130, a network 110, a single repository 140, and a single server 120 are shown in FIG. 1 merely for simplicity purposes and without limitation on the disclosed embodiments.

Figure 2:
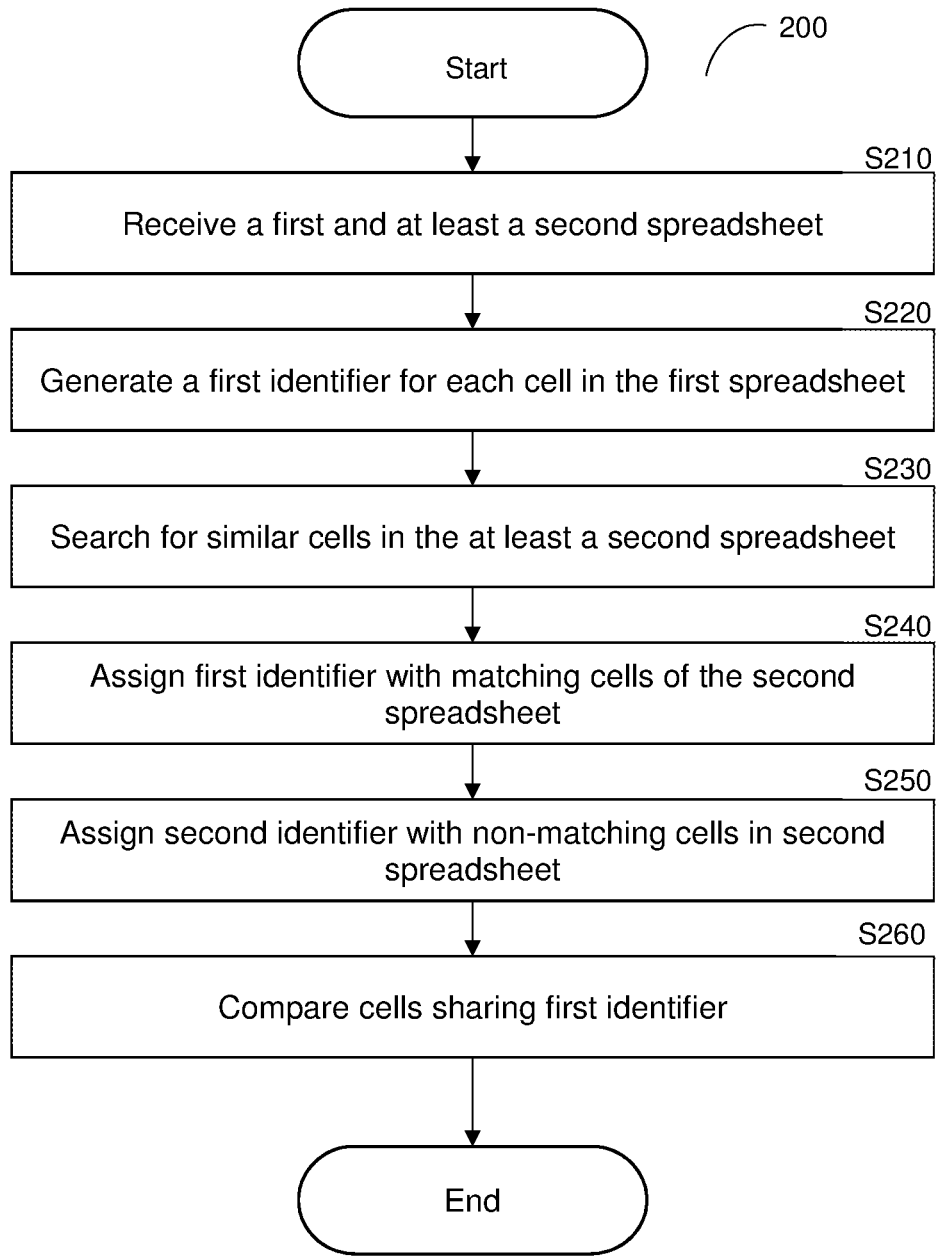
FIG. 2 is a flowchart illustrating the operation of a method for cell comparison between spreadsheets according to an embodiment.

FIG. 2 illustrates a flowchart 200 for comparing cell between a first spreadsheet and at least one second spreadsheet according to an embodiment.

At S210, a first spreadsheet and at least second spreadsheet are received, e.g., by the server 120 of FIG. 1. In an example embodiment, the first and second spreadsheets are consecutive versions, that is, the first spreadsheet is a first version that was created or modified before the second version, i.e., the second spreadsheet. It should be noted that each such version is a spreadsheet file. As noted above, a spreadsheet file includes a plurality of cells organized in at least a two-dimensional array. A cell contains a value having a data and metadata. The data includes a string, a number, a formula, and so on. Metadata of a cell relates to its formatting, e.g., a text font, a text size, header's cell's location, text color, border, cells' structure, cells' reference, and so on. The first spreadsheet may include header cells and value cells, where header cells are descriptive of value cells.

Each cell includes one or more characteristics, where the characteristics are associated with the data and metadata of the cell, as well as the cell's location within the spreadsheet, relation to other cells within the spreadsheet, and the like. The characteristics can be used to identify each cell.

At S220, a unique first identifier is generated and assigned to each cell containing data within the first spreadsheet. The first identifier may include an alphanumeric string, a character, a number, a combination thereof, and the like, that is unique for each cell.

At S230, at least one second spreadsheet (herein referred to as a second spreadsheet) is accessed and analyzed, where the analysis includes searching the cells within the second spreadsheet that are similar to any of the cells within the first spreadsheet. That is, the characteristics of the cells within the second spreadsheet are analyzed to determine a similarly to cells in the first spreadsheet. If the similarity between cells is above a predetermined threshold, a match is determined to exist. For example, a threshold may require a matching header cell with at least 10 value cells located directly beneath the header cell, where the value cells only contain numbers.

In an embodiment, S230 includes comparing between header cells (cells which may contain headers) as identified in each of the spreadsheets, and comparing value cells associated with each header. For example, a header in the first spreadsheet may read 'January' and only have two value cells directly beneath it, while a heading in the second spreadsheet may also read 'January' and have three value cells directly beneath it. The two value cells and the three value cells may each be grouped together and associated with the 'January' header cell.

The comparison of the header cells' data and metadata may result in similar header cells and dissimilar header cells in the first and second spreadsheets. Based on the locations of the similar and dissimilar header cells, any changes in the structure of the spreadsheet are determined. For example, value cells associated with a header in the first spreadsheet may be grouped vertically in a column beneath the header, while value cells associated with a similar header in the second spreadsheet may be grouped horizontally across a row to the right of the header. Both groups of value cells may still be determined to be similar enough to match.

At S240, each cell in the second spreadsheet that is determined to match a cell in the first spreadsheet are assigned a matching first identifier.

At optional S250, a unique second identifier is assigned to each cell of the second spreadsheet that does not have a similar corresponding cell in the first spreadsheet. The second identifier may include an alphanumeric string, a character, a number, a combination thereof, and the like, that is not related to any of the first identifiers.

At optional S260, a first cell of the first spreadsheet is compared to a second cell of the second spreadsheet having the same first identifier. The comparison may include comparing the characteristic of the cell, including the data and the metadata associate therewith. For example, a value cell, comprising a certain number value, located beneath the header cell 'January' and next to the header cell 'Cars' at a first spreadsheet may include the same first identifier, e.g. 'ID: 100' as a cell found in a second spreadsheet and at a third spreadsheet. According to the same example, even in a case where the number within the value cell changes among the three versions, the cells are determined to match based on their characteristics, and thus will be assigned the same first identifier. Cells sharing the same first identifier are compared. For example, it may be determined that between the first spreadsheet and the second spreadsheet, the cell having an identifier of 'ID: 100' has increased in value from '110' to '160'.

FIG. 3 examples a diagram of a first spreadsheet and a second spreadsheet according to an embodiment. The first spreadsheet 310 represents a first version of a spreadsheet, and the second spreadsheet 320 represents a second version of the spreadsheet. An entire column, the column having the header 'Mar' 315, has been removed in the second spreadsheet 320. Therefore, the identifiers 'ID: 3' associated with 'Mar' header cell, the identifier 'ID: 7' associated with '37' value cell and the identifier 'ID: 11' associated with '6' value cell, do not exist in the second spreadsheet 320.

The value '9' in the second spreadsheet 320 has the same identifier, which is 'ID: 5', as the value '18' in the first spreadsheet 310. Based on a determination that the value cell that includes the value '9' in the second spreadsheet 320, is similar, above a predetermined threshold, to the value cell at the first spreadsheet 310 that includes the value '18', the same first identifier is associated to the value cell '9'. By comparing the values of identifier 'ID: 5', a decrease of 9 'Apples' can be identified. Identifier number 'ID: 10' indicates on an increase of 11 'Bananas' related to 'February'.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C", or "one or more of A, B, or C", or "at least one of the group consisting of A, B, and C", or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for cell tracking between spreadsheets, comprising:
   assigning a unique first identifier to each cell containing data within a first spreadsheet, the assigned identifier being different from any identifier of the cell inherently provided by the first spreadsheet;
   identifying characteristics of each cell containing data within the first spreadsheet and each cell containing data within at least one second spreadsheet, wherein the characteristics include data and metadata associated with each of the cells and wherein the first spreadsheet and the at least one second spreadsheet comprise at least a two-dimensional array of cells, wherein the metadata includes formatting attributes for each of the cells;
   analyzing the cells of the at least one second spreadsheet to compare for similarity each cell therein to the cells of the first spreadsheet, wherein the similarity comparison is based on the identified characteristics of each cell, and wherein the result of the similarity comparison above a predetermined threshold is identified as a match;
   assigning the unique first identifier of a cell of the first spreadsheet to a matching cell of the at least one second spreadsheet; and
   generating a unique second identifier in the at least one second spreadsheet for each cell therein that is not identified as a match of a cell in the first spreadsheet.

2. The method of claim 1, further comprising:
   comparing the characteristics of a matching first cell with the characteristics of the matching second cell.

3. The method of claim 2, wherein comparing the characteristics further comprises:
   identifying changes in content associated with the matching first cell and the matching second cell.

4. The method of claim 3, wherein the changes in content includes at least one of: a data difference, and a metadata difference.

5. The method of claim 1, wherein the identifying characteristics of each cell within the first spreadsheet and within the at least one second spreadsheet further includes identifying header cells and value cells, where header cells are descriptive of the value cells.

6. The method of claim 5, further comprising:
   comparing header cells of the first spreadsheet to headers cells of the at least one second spreadsheet; and
   comparing value cells of the first spreadsheet to value cells of the at least one second spreadsheet, wherein matching and non-matching value cells are identified based on the comparison of header cells data and the comparison of header cells metadata.

7. The method of claim 1, wherein the comparison further includes analyzing the structure of the cells of first spreadsheet and the cells of the at least one second spreadsheet.

8. A non-transitory computer readable medium having stored thereon instructions for causing a processing circuitry to execute a process, the process comprising:
   assigning a unique first identifier to each cell containing data within a first spreadsheet, the assigned identifier being different from any identifier of the cell inherently provided by the first spreadsheet;
   identifying characteristics of each cell containing data within the first spreadsheet and each cell containing data within at least one second spreadsheet, wherein the characteristics include data and metadata associated with each of the cells and wherein the first spreadsheet and the at least one second spreadsheet comprise at least a two-dimensional array of cells, wherein the metadata includes formatting attributes for each of the cells;
   analyzing the cells of the at least one second spreadsheet to compare for similarity each cell therein to the cells of the first spreadsheet, wherein the similarity comparison is based on the identified characteristics of each cell, and wherein the result of the similarity comparison above a predetermined threshold is identified as a match;
   assigning the unique first identifier of a cell of the first spreadsheet to a matching cell of the at least one second spreadsheet; and
   generating a unique second identifier in the at least one second spreadsheet for each cell therein that is not identified as a match of a cell in the first spreadsheet.

9. A system for cell tracking between spreadsheets, comprising:
   a processing circuitry; and
   a memory, the memory containing instructions that, when executed by the processing circuitry, configure the system to:
   assign a unique first identifier to each cell containing data within a first spreadsheet, the assigned identifier being different from any identifier of the cell inherently provided by the first spreadsheet;
   identify characteristics of each cell containing data within the first spreadsheet and each cell containing data within at least one second spreadsheet, wherein the characteristics include data and metadata associated with each of the cells and wherein the first spreadsheet and the at least one second spreadsheet comprise at least a two-dimensional array of cells, wherein the metadata includes formatting attributes for each of the cells;
   analyze the cells of the at least one second spreadsheet to compare for similarity each cell therein to the cells of the first spreadsheet, wherein the similarity comparison is based on the identified characteristics of each cell, and wherein the result of the similarity comparison above a predetermined threshold is identified as a match;

assign the unique first identifier of a cell of the first spreadsheet to a matching cell of the at least one second spreadsheet; and generate a unique second identifier in the at least one second spreadsheet for each cell therein that is not identified as a match of a cell in the first spreadsheet.

10. The system of claim 9, wherein the system is further configured to:

comparing the characteristics of a matching first cell with the characteristics of the matching second cell.

11. The system of claim 10, wherein comparing the characteristics further comprises:

identifying changes in content associated with the matching first cell and the matching second cell.

12. The system of claim 11, wherein the changes in content includes at least one of: a data difference, and a metadata difference.

13. The system of claim 9, wherein the identifying characteristics of each cell within the first spreadsheet and within the at least one second spreadsheet further includes identifying header cells and value cells, where header cells are descriptive of the value cells.

14. The system of claim 13, wherein the system is further configured to:

comparing header cells of the first spreadsheet to header cells of the at least one second spreadsheet; and comparing value cells of the first spreadsheet to value cells of the at least one second spreadsheet, wherein matching and non-matching value cells are identified based on the comparison of header cells data and the comparison of header cells metadata.

15. The system of claim 9, wherein the comparison further includes analyzing the structure of the cells of the first spreadsheet and the cells of the at least one second spreadsheet.

* * * * *